US012406801B2

(12) United States Patent
Hammer et al.

(10) Patent No.: US 12,406,801 B2
(45) Date of Patent: Sep. 2, 2025

(54) ON-LOAD TAP CHANGER AND METHOD FOR ACTUATING AN ON-LOAD TAP CHANGER

(71) Applicant: Maschinenfabrik Reinhausen GmbH, Regensburg (DE)

(72) Inventors: Christian Hammer, Regensburg (DE); Dominik Plitzko, Regensburg (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 219 days.

(21) Appl. No.: 18/250,752

(22) PCT Filed: Sep. 30, 2021

(86) PCT No.: PCT/EP2021/076970

§ 371 (c)(1), (2) Date: Apr. 27, 2023

(87) PCT Pub. No.: WO2022/089870

PCT Pub. Date: May 5, 2022

(65) Prior Publication Data

US 2023/0411072 A1 Dec. 21, 2023

(30) Foreign Application Priority Data

Oct. 29, 2020 (DE) ..................... 10 2020 128 463.2

(51) Int. Cl.
*H01F 29/04* (2006.01)
*H01H 9/00* (2006.01)

(52) U.S. Cl.
CPC ........... *H01F 29/04* (2013.01); *H01H 9/0016* (2013.01)

(58) Field of Classification Search
CPC ............... H01H 21/20; H01H 2003/00; H01H 2009/00; H01H 2009/0005;
(Continued)

(56) References Cited

U.S. PATENT DOCUMENTS 9,513,654 B2 * 12/2016 Strof ......................... G05F 5/00
2011/0102056 A1 5/2011 Brueckl et al.
2012/0032654 A1 2/2012 Brueckl et al.

FOREIGN PATENT DOCUMENTS

DE 102009017196 A1 10/2010
DE 202011109907 U1 7/2012
(Continued)

*Primary Examiner* — Anthony R Jimenez
(74) *Attorney, Agent, or Firm* — LEYDIG, VOIT & MAYER, LTD.

(57) ABSTRACT

An on-load tap-changer switches, without interruption, between winding taps of a tapped transformer. The on-load tap-changer includes fixed contacts, which include a first fixed contact, which is configured to connect to a first winding tap of the tapped transformer; and a second fixed contact, which is configured to connect to a second winding tap of the tapped transformer. The on-load tap-changer also includes a first selector arm, which is configured such that it can contact each of the fixed contacts; a second selector arm, which is configured such that it can contact each of the fixed contacts; and a diverter switch configured to perform a switch from the first fixed contact to the second fixed contact of the on-load tap-changer; a connection contact arranged additionally to the fixed contacts; and an auxiliary contact, which configured to selectively contact the connection contact or one of the fixed contacts.

9 Claims, 8 Drawing Sheets

(58) Field of Classification Search
CPC ... H01H 2009/0016; H01H 2009/0061; H01H 1/56; H01H 15/08; H01H 19/12; H01H 9/00; H01H 9/0005; H01H 9/0011; H01H 9/0016; H01H 9/0027; H01H 9/0066; H01H 9/0038; H01F 29/04
USPC ............................................................ 200/11
See application file for complete search history.

(56) References Cited

FOREIGN PATENT DOCUMENTS

| | | | |
|---|---|---|---|
| DE | 102018113982 | A1 | 12/2019 |
| EP | 2319058 | B1 | 7/2014 |
| WO | WO-2020030445 | A1 * | 2/2020 |
| WO | WO 2020078599 | A1 | 4/2020 |

* cited by examiner

ON-LOAD TAP CHANGER AND METHOD FOR ACTUATING AN ON-LOAD TAP CHANGER

CROSS REFERENCE TO RELATED APPLICATIONS

This application is a U.S. National Phase application under 35 U.S.C. § 371 of International Application No. PCT/EP2021/076970, filed on Sep. 30, 2021, and claims benefit to German Patent Application No. DE 10 2020 128 463.2, filed on Oct. 29, 2020. The International Application was published in German on May 5, 2022 as WO 2022/089870 A1 under PCT Article 21(2).

FIELD

The present disclosure relates to an on-load tap-changer for switching, without interruption, between winding taps of a tapped transformer under load.

BACKGROUND

An on-load tap-changer consists of a mechanical step selector for powerlessly pre-selecting the particular winding tap that is to be switched over to, and a diverter switch with semiconductor switching elements as switching means for actually switching, without interruption, from the previous to the pre-selected new winding tap under load.

On-load tap-changers of this kind are usually also referred to as hybrid tap changers because they also have mechanical contacts in addition to the power electronic switching means. A hybrid tap changer of this kind is known from EP 2319058 B1. It has two load paths which each connect a winding tap via a mechanical switch and a series circuit arranged in series therewith formed from two oppositely switched IGBTs to a common load take-off lead. A diode is provided parallel to each IGBT. A varistor is, in turn, provided parallel to each individual IGBT. In stationary operation, each of the load paths is bridged with a mechanical main contact. The IGBTs of both sides are controlled by a common IGBT driver.

The mechanical step selector and optionally further mechanical switching elements provided in the diverter switch are actuated by means of a motor drive, whereas the power electronic switching means are operated via a separate actuation means, which must be supplied with power.

SUMMARY

In an embodiment, the present disclosure provides an on-load tap-changer that switches, without interruption, between winding taps of a tapped transformer. The on-load tap-changer includes fixed contacts, which include a first fixed contact, which is configured to connect to a first winding tap of the winding taps of the tapped transformer; and a second fixed contact, which is configured to connect to a second winding tap of the winding taps of the tapped transformer. The on-load tap-changer also includes a first selector arm, which is configured such that it can contact each of the fixed contacts; a second selector arm, which is configured such that it can contact each of the fixed contacts; and a diverter switch configured to perform a switch from the first fixed contact to the second fixed contact of the on-load tap-changer; a connection contact arranged additionally to the fixed contacts; and an auxiliary contact, which configured to selectively contact the connection contact or one of the fixed contacts.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
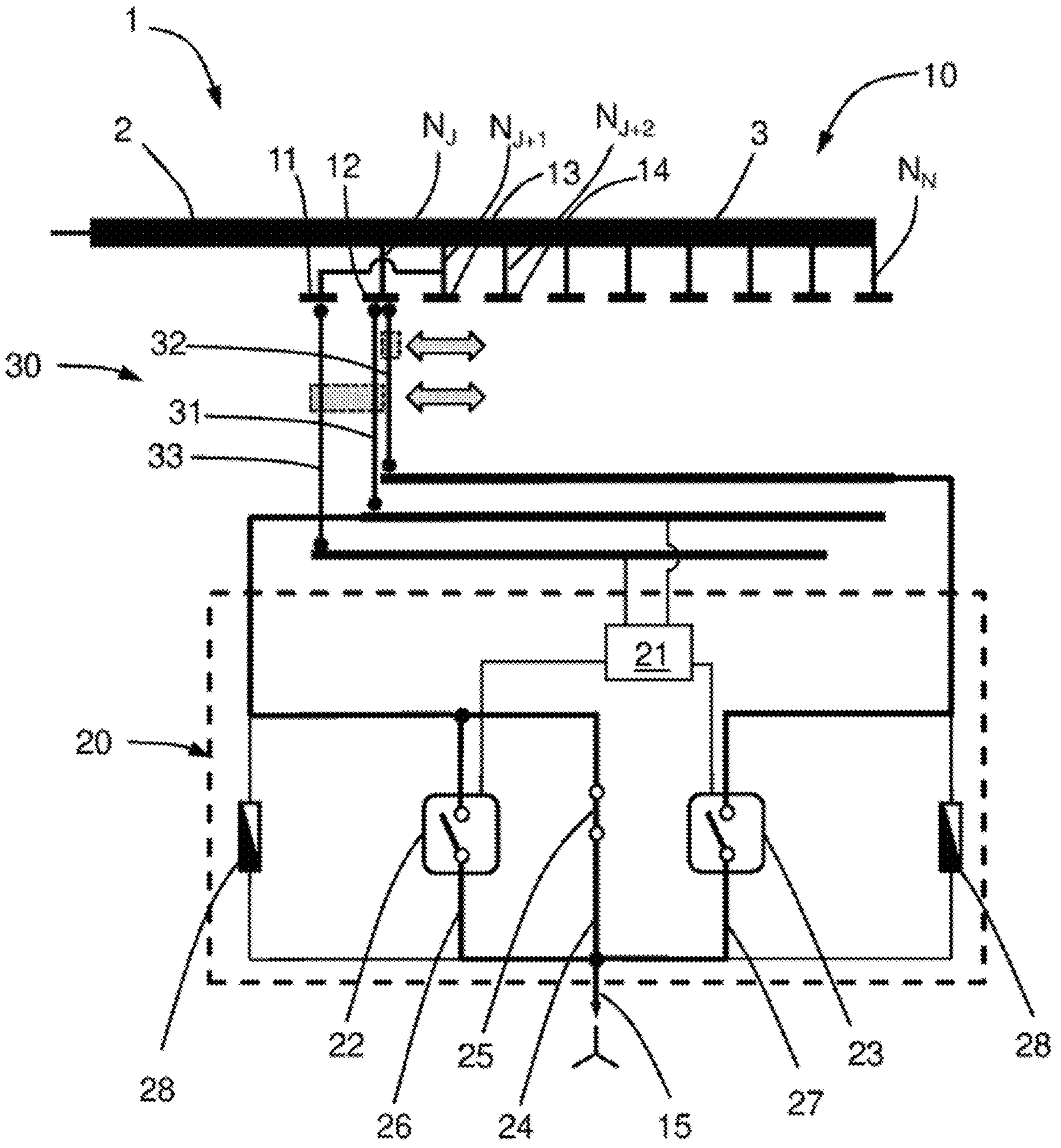
FIG. 1 shows a schematic representation of an exemplary embodiment of an on-load tap-changer according to the improved concept.

Aspects of the present disclosure provide an improved concept for supplying power to the power electronic switching means of an on-load tap-changer.

Aspects of the present disclosure are based on the concept of being able to contact the fixed contacts of the on-load tap changer, which are each connectable to a winding tap of the tap winding of the transformer, in order to supplement an additional connection contact, which can be contacted by an auxiliary contact of the on-load tap changer.

In accordance with a first aspect of the improved concept, an on-load tap-changer for uninterrupted switching between winding taps of a tapped transformer is described. The on-load tap changer comprises a first fixed contact, which is connectable to a first winding tap of the tapped transformer, and a second fixed contact, which is connectable to a second winding tap of the tapped transformer. The total number of fixed contacts is dependent on the number of winding taps. A first selector arm of the on-load tap changer can contact each of the fixed contacts and a second selector arm can likewise contact each of the fixed contacts. To perform a switch from a first fixed contact to a second fixed contact, the on-load tap changer has a diverter switch. Furthermore, the on-load tap changer comprises an additional connection contact, which is arranged analogously to the fixed contacts, and an auxiliary contact, which can selectively contact the connection contact or one of the fixed contacts.

The connection contact is formed in such a way that it can be contacted by the auxiliary contact.

Each fixed contact is formed in such a way that it can be contacted by the first and/or by the second selector arm. Each fixed contact preferably has a first contact face, which can be contacted by the first selector arm, and a second contact face, which can be contacted by the second selector arm. In addition, the first or the second contact face can be contacted by the auxiliary contact.

According to at least one embodiment, the connection contact is bridged with the second fixed contact. The connection contact therefore does not have to be electrically connected to an additional winding tap.

According to at least one further embodiment, the auxiliary contact is mechanically coupled to the first selector arm.

This means, specifically, that the auxiliary contact and the first selector contact in the closed state, that is to say when they are not moved, are located on adjacent contacts. Consequently, the auxiliary contact and the first selector arm are never located on the same fixed contact or at the same time on the connection contact.

According to at least one further embodiment the diverter switch, for the switch, has a plurality of semiconductor switching elements, which are actuatable by means of a control unit.

The semiconductor switching elements are preferably formed as insulated-gate bipolar transistor (IGBT) switching elements and/or as thyristors and/or as junction field-effect transistor (JFET) switching elements and/or as metal-oxide semiconductor field-effect transistor (MOSFET) switching elements and/or as integrated gate commutated thyristors (IGCT). The semiconductor switching elements are particularly preferably formed in each case as an IGBT with diodes in a bridge circuit.

According to at least one embodiment the control unit is formed as a microcontroller.

According to at least one further embodiment the control unit, and thus also the semiconductor switching elements, are supplied with power, whereas the auxiliary contact contacts the connection contact or one of the fixed contacts and the first selector arm likewise contacts one of the fixed contacts.

Due to the mechanical coupling of the first selector arm and of the auxiliary contact, the first selector arm and the auxiliary contact are not at any time during the switching process arranged on the same fixed contact or at the same time on the connection contact. This in turn means that at any time during the switching process in which the first selector arm contacts a fixed contact, a voltage amounting to a step voltage is applied between the first selector arm and the auxiliary contact and is used to supply power to the control unit. The control unit and thus also the semiconductor switching elements are thus operated independently by means of the applied step voltage. An additional power supply from outside, for example by a motor controller, is therefore not necessary.

According to at least one further embodiment the control unit has an energy accumulator which is charged when the control unit is supplied with power.

The energy accumulator is charged via the voltage difference that exists between the first selector arm and the auxiliary contact on account of the mechanical coupling and the contacting of different fixed contacts or the connection contact and the first fixed contact.

No step voltage is applied during the actuation of the first selector arm and the auxiliary contact. During this time, the control unit consequently is not supplied with power. For this reason an energy accumulator can be provided as a safety measured, which ensures that the power supply of the power electronics is ensured at all times during the switching process.

The energy accumulator is preferably formed from ceramic capacitors and therefore has a higher temperature resistance. To charge the energy accumulator, a switching network part with an extremely wide input voltage range is preferably used, which still functions even at low step voltages.

In accordance with a second aspect of the improved concept, a method for actuating an on-load tap-changer which is formed in accordance with the first aspect of the improved concept is described.

With regard to the method, reference is analogously made to the above explanations, preferred features and/or advantages, as has already been explained in relation to the first aspect of the improved concept or one of the associated, advantageous embodiments.

For switching from a first fixed contact to a second fixed contact, the method comprises the following steps:

- actuating at least one of the semiconductor switching elements of the diverter switch,
- switching a second selector arm from the first fixed contact to the second fixed contact,
- actuating at least one of the semiconductor switching elements of the diverter switch,
- switching a first selector arm from the first fixed contact to the second fixed contact, wherein an auxiliary contact is switched from a connection contact to the first fixed contact at the same time as the switching of the first selector arm to the second fixed contact.

According to a preferred embodiment a switching from the second fixed contact to a third fixed contact, which is formed in accordance with the second fixed contact and is connected to a third winding tap of the tapped transformer, comprises the following steps:

- actuating at least one of the semiconductor switching elements of the diverter switch,
- switching the second selector arm from the second fixed contact to the third fixed contact,
- actuating at least one of the semiconductor switching elements of the diverter switch,
- switching the first selector arm from the second fixed contact to the third fixed contact, wherein the auxiliary contact is switched from the first fixed contact to the second fixed contact at the same time as the switching of the first selector arm to the third fixed contact.

Further embodiments and implementations of the method are directly evident from the various embodiments of the tap-changer, and vice versa. In particular, individual components or a plurality of the components and/or assemblies described in relation to the tap-changer can be implemented to carry out the method accordingly.

In the following, the aspects of the present disclosure are explained in detail on the basis of exemplary embodiments with reference to the drawings. Components which are identical or functionally identical or which have an identical effect may be provided with identical reference signs. Identical components or components with an identical function are in some cases explained only in relation to the figure in which they first appear. The explanation is not necessarily repeated in the subsequent figures.

The figures merely illustrate exemplary embodiments of the present disclosure without, however, limiting the invention to the illustrated exemplary embodiments.

FIG. 1 shows a schematic representation of an exemplary embodiment of an on-load tap-changer 10 for a tapped transformer 1 according to the improved concept. The tapped transformer 1 has a main winding 2 and a tap winding 3 with different winding taps $N_J$, $N_{J+1}$, . . . , $N_N$, which are moved to a closed or open position by the on-load tap-changer 10.

According to the improved concept, the on-load tap-changer 10 comprises at least one first fixed contact 12, which is connectable to a first winding tap $N_J$, a second fixed contact 13, which is connectable to a second winding tap $N_{J+1}$, and a third fixed contact 14, which is connectable to a third winding tap $N_{J+2}$ of the tap winding 3 of the tapped transformer 1. The total number of fixed contacts is dependent on the number of winding taps. Additionally to the fixed contacts, the on-load tap-changer 10 has a further connection contact 11, which is bridged with the second fixed contact 13. The connection contact 11 is not directly connected to any of the winding taps $N_J, N_{J+1}, \ldots, N_N$.

To powerlessly preselect the fixed contacts 12, 13, the on-load tap-changer 10 comprises a selector 30 with a first selector arm 31 and a second selector arm 32, which are actuatable independently of one another and which can contact each of the fixed contacts. Additionally to the selector arms 31, 32, the on-load tap-changer 10 has an auxiliary contact 33, which is mechanically coupled to the first selector arm 31.

The on-load tap-changer 10 furthermore comprises a diverter switch 20 for carrying out the actual diverter switch operation between the preselected fixed contacts 12, 13. The diverter switch 20 has a total of three current paths: a main path 24 with a mechanical switching element 25, which can connect both the first selector arm 31 and the second selector arm 32 to a load take-off lead 15; a first auxiliary path 26 with a first semiconductor switching element 22, which is arranged parallel to the main path 24 and can connect the first selector arm 31 to the load take-off lead 15; and a second auxiliary path 27 with a second semiconductor switching element 23, which can connect the second selector arm 32 to the load take-off lead 15. A varistor 28 is arranged parallel to each of the first and the second auxiliary path 26, 27. The semiconductor switching elements 22 and 23 are actuated by means of a control unit (controller) 21.

The described, specific circuit arrangement of the diverter switch 20 has been selected by way of example. In principle, the improved concept can be implemented in any on-load tap-changer that has a diverter switch with semiconductor switching elements as switching means for interruption-free switching.

In the illustration in FIG. 1, the on-load tap-changer 10 is in a stationary position. The first and the second selector arm 31, 32 are both located on the first fixed contact 12. The auxiliary contact 33 is arranged on the additional connection contact 11, which is bridged with the second fixed contact 13. A step voltage is thus applied between the selector arm 31 and the auxiliary contact 33 and the control unit 21 is supplied with power. The load current $I_L$ flows from the contacted fixed contact 12 to the load take-off lead 15 via the first selector arm 31, the main path 24 and the closed mechanical switching element 25. The two semiconductor switching elements 22 and 23 are moved to the open position.

FIGS. 2*a* to 2*g* show an exemplary switching sequence of the on-load tap-changer from FIG. 1.

Figure 2A:
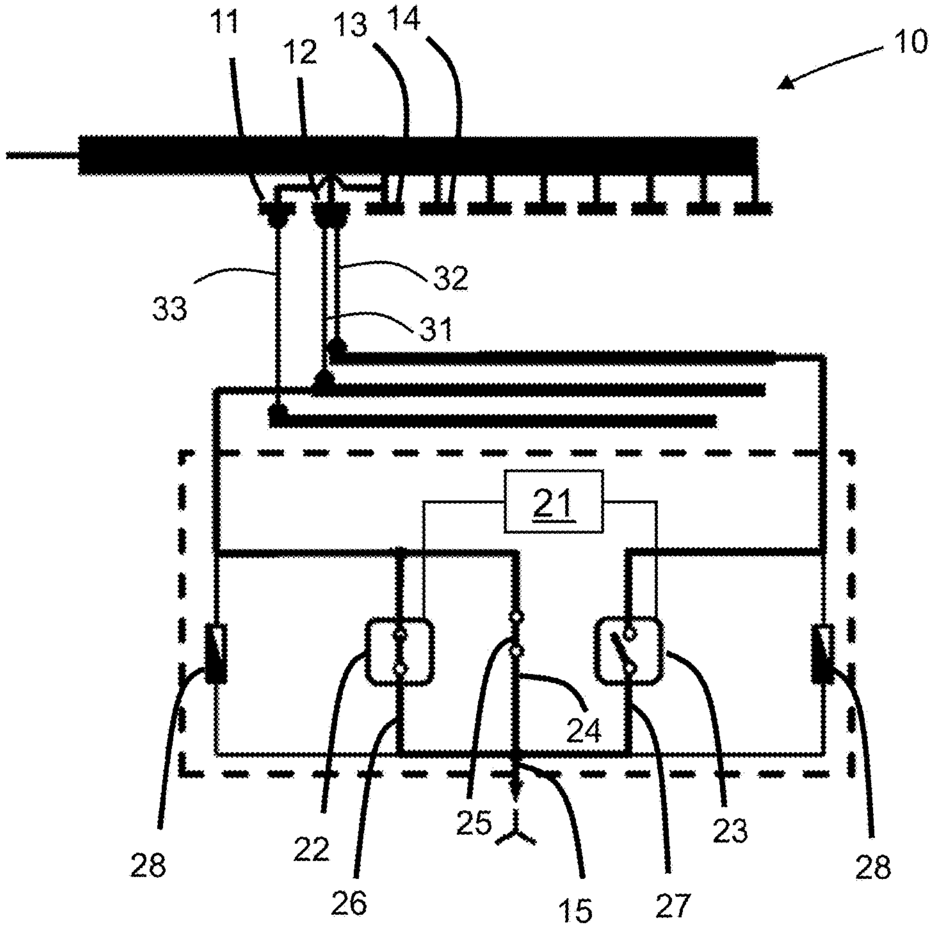
FIGS. 2*a* to 2*g* show an exemplary switching process of the on-load tap-changer from FIG. 1.
Figure 2B:
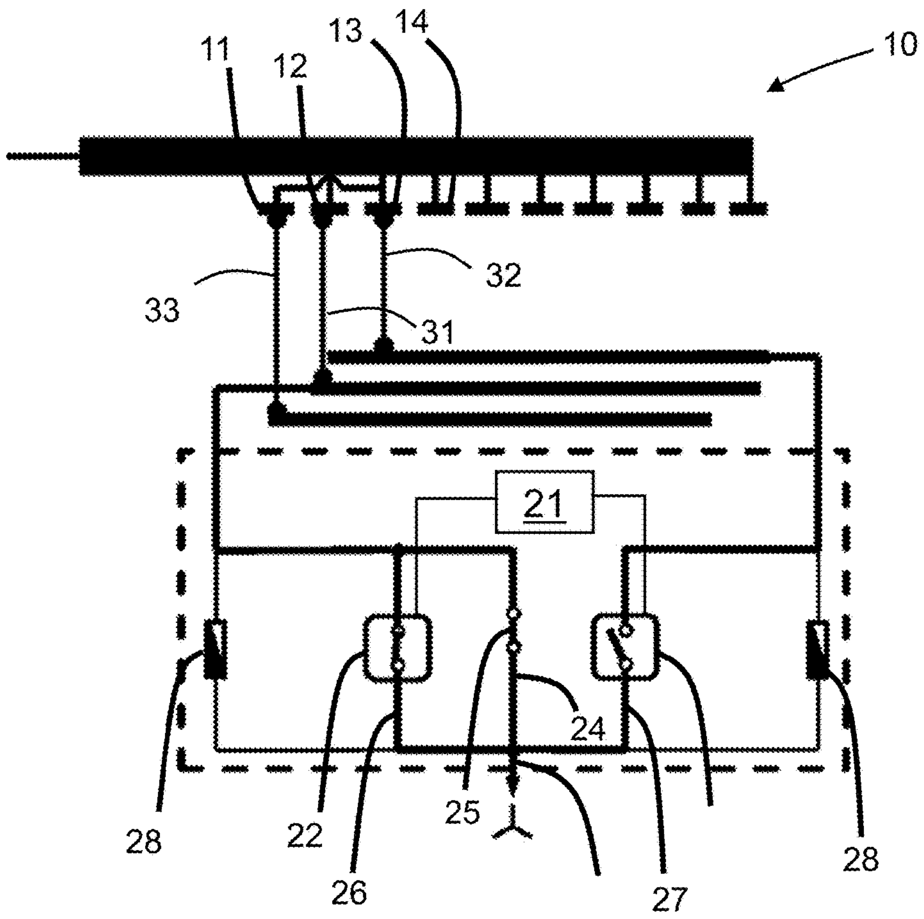

In a switching process from the first fixed contact 12 to the second fixed contact 13, the first semiconductor switching element 22 is switched on by means of the control unit 21 in a first step (FIG. 2*a*).

In the next step (FIG. 2*b*) the second selector arm 32, which is currentless, is moved from the first fixed contact 12 to the second fixed contact 13.

Figure 2C:
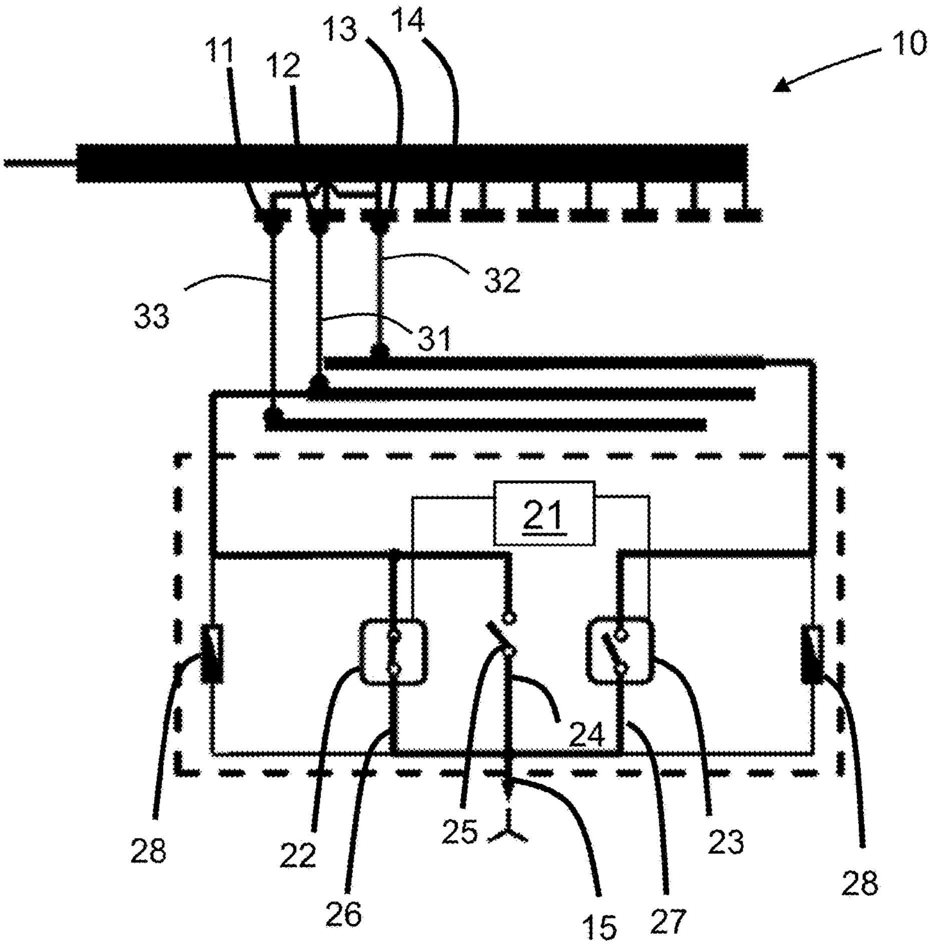
Figure 2D:
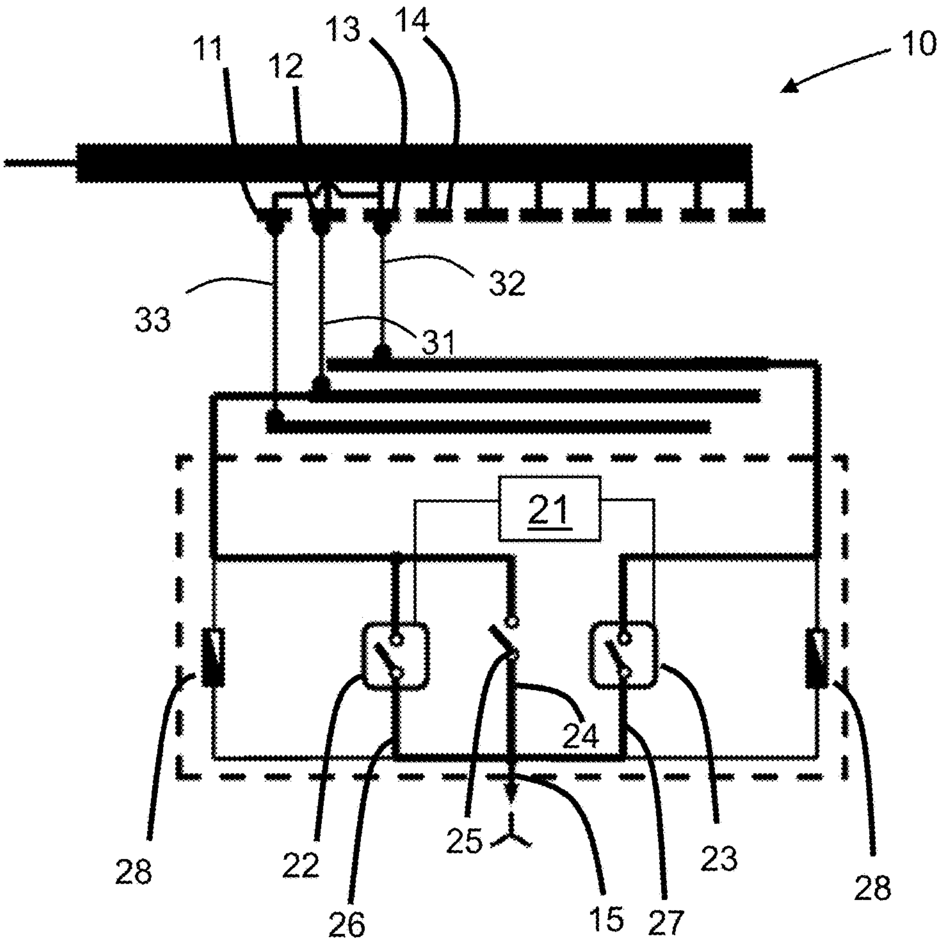

The mechanical switching element 25 is then opened (cf. FIG. 2*c*). The load current $I_L$ then flows via the first auxiliary path 26 and the activated first semiconductor switching element 22.

In the next step (FIG. 2*d*) the first semiconductor switching element 22 is preferably moved to the open position in the zero crossing of the current. The temporal profile of the current can be detected by the control unit 21 for example by means of a current sensor, which is arranged in the current path of the take-off lead 15. As the first semiconductor element 22 is moved to the open position, the load current IL transfers to the varistor 28 arranged parallel thereto.

Figure 2E:
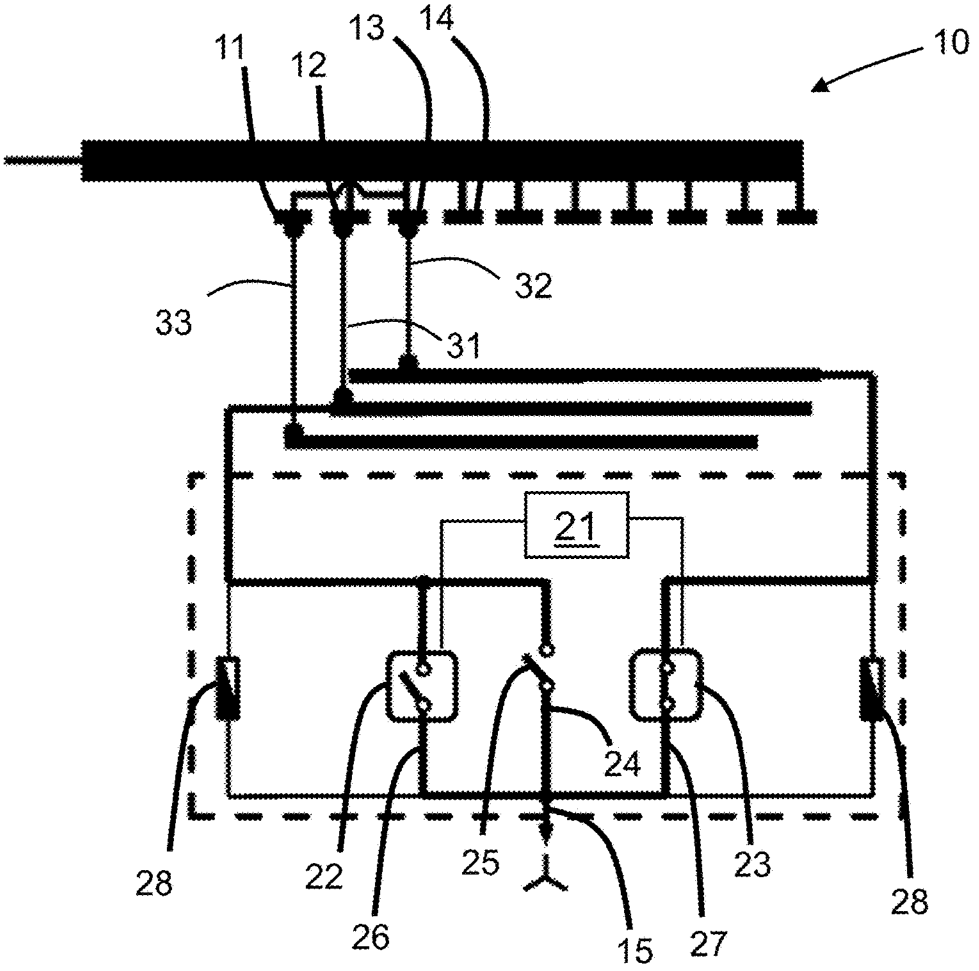

In the next step, shown in FIG. 2*e*, the second semiconductor switching element 23 is switched on after a fixed period, for example 5 μs. The load current $I_L$ is thus switched to the second fixed contact 13 and flows from the second selector arm 32 via the second auxiliary path 27 and the activated second semiconductor switching element 23 to the take-off lead 15.

Figure 2F:
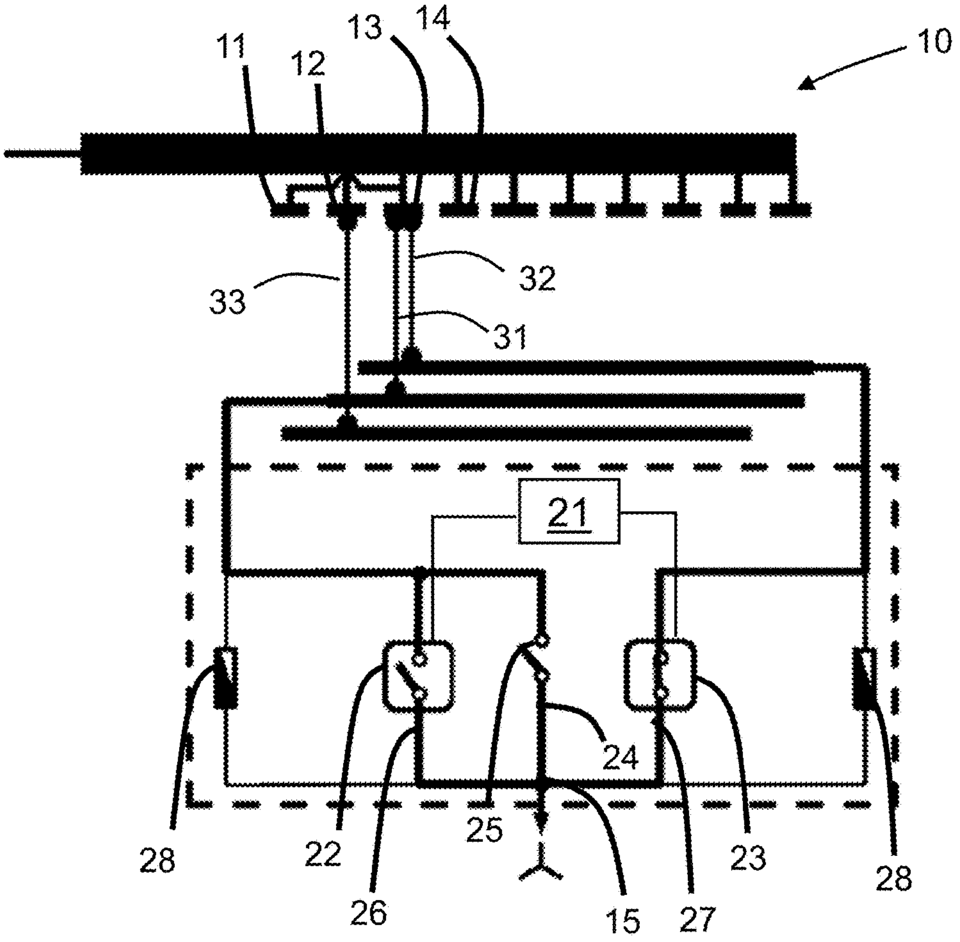

The first selector arm 31, which is now currentless, is then switched to the second fixed contact 13, and at the same time the auxiliary contact 33 is switched from the connection contact 11 to the first fixed contact 12 (FIG. 2*f*).

In the next step (FIG. 2*g*) the mechanical switching element 25 is closed again and then the second semiconductor switching element 23 is moved to the open position by the control unit 21. The on-load tap-changer 10 has now reached the second stationary position. When the mechanical switching element 25 is closed, the load current $I_L$ passes back to the main path 24. The first and the second selector arm 31, 32 are both located on the second fixed contact 13 and the auxiliary contact 33 is located on the first fixed contact 12. The load current $I_L$ now flows from the second fixed contact 13 via the first selector arm 31 and the main path 24 with the closed mechanical switching element 25 to the load take-off lead 15. This completes the diverter switch operation to the second fixed contact 13.

Switching from the second fixed contact 13 to the third fixed contact 14 is performed similarly to steps 2*a*-2*g*, merely with the difference that the auxiliary contact 33 at the start of the switching is not arranged on the connection contact 11, but on a solid contact, specifically the first fixed contact 12.

Figure 2G:
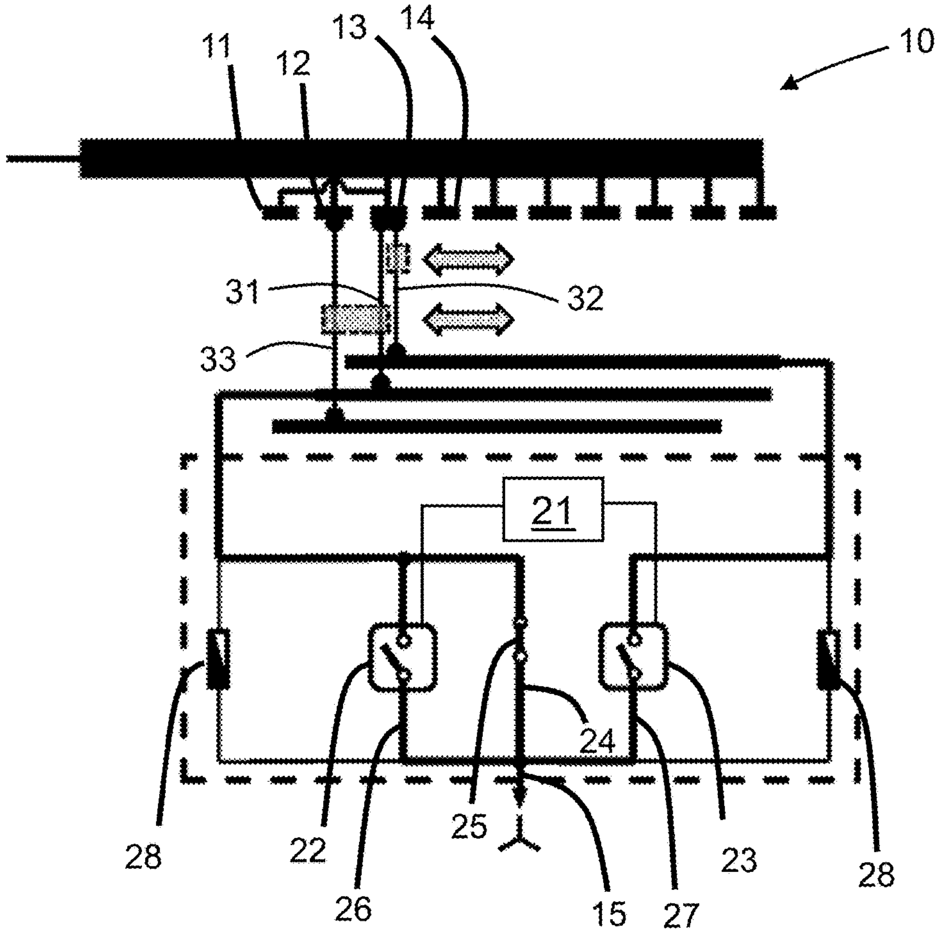

Switching in the opposite direction, for example from the second fixed contact 13 to the first fixed contact 12, is performed precisely in the reverse sequence, that is to say according to FIGS. 2*g* to 2*a*.

It is assumed that the present disclosure and many of the attendant advantages thereof can be understood from the above description. Furthermore, it is clear that various changes can be made to the shape, construction and arrangement of the components without departing from the disclosed subject matter or without sacrificing all material advantages. The embodiments described are merely explanatory and such changes are intended to be covered by the following claims. Furthermore, it is understood that the invention is defined by the following claims.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

1 Tapped transformer
2 Main winding
3 Tap winding
10 On-load tap-changer
11 Connection contact
12 First fixed contact
13 Second fixed contact
14 Third fixed contact
15 Load take-off lead
20 Diverter switch
21 Control unit
22 First semiconductor switching element
23 Second semiconductor switching element
24 Main path
25 Mechanical switching element
26 First auxiliary path
27 Second auxiliary path
28 Varistor
30 Selector
31 First selector arm
32 Second selector arm
33 Auxiliary contact
($N_J$, $N_{J+1}$, . . . , $N_N$) Winding taps

The invention claimed is:

1. An on-load tap-changer for switching, without interruption, between winding taps of a tapped transformer, the on-load tap-changer comprising:

fixed contacts comprising:

a first fixed contact, which is configured to connect to a first winding tap of the winding taps of the tapped transformer; and a second fixed contact, which is configured to connect to a second winding tap of the winding taps of the tapped transformer;

a first selector arm, which is configured such that it can contact each of the fixed contacts;

a second selector arm, which is configured such that it can contact each of the fixed contacts; and a diverter switch configured to perform a switch from the first fixed contact to the second fixed contact of the on-load tap-changer;

a connection contact arranged additionally to the fixed contacts; and an auxiliary contact, which is configured to selectively contact the connection contact or one of the fixed contacts, wherein the connection contact is bridged with the second fixed contact, and wherein the auxiliary contact is mechanically coupled to the first selector arm.

2. The on-load tap-changer as claimed in claim 1, wherein the diverter switch, for switching, comprises a plurality of semiconductor switching elements which are actuatable by a controller.

3. The on-load tap-changer as claimed in claim 2, wherein the controller is configured to be supplied with power whilst the auxiliary contact contacts the connection contact or one of the fixed contacts and the first selector arm contacts one of the fixed contacts.

4. The on-load tap-changer as claimed in claim 3, wherein the controller has an energy accumulator which is configured to be charged when the controller is supplied with power.

5. A method for actuating the on-load tap-changer as claimed claim 1, the method comprising:

switching from the first fixed contact to the second fixed contact by:

actuating at least one of the semiconductor switching elements of the diverter switch;

switching the second selector arm from the first fixed contact to the second fixed contact;

actuating at least one of the semiconductor switching elements of the diverter switch; and switching the first selector arm from the first fixed contact to the second fixed contact, wherein the auxiliary contact is switched from the connection contact to the first fixed contact at the same time as the switching of the first selector arm to the second fixed contact.

6. The method as claimed in claim 5, wherein switching from the second fixed contact to a third fixed contact comprises the following steps:

actuating at least one of the semiconductor switching elements of the diverter switch, switching the second selector arm from the second fixed contact to the third fixed contact, actuating at least one of the semiconductor switching elements of the diverter switch, switching the first selector arm from the second fixed contact to the third fixed contact, wherein the auxiliary contact is switched from the first fixed contact to the second fixed contact at the same time as the switching of the first selector arm to the third fixed contact.

7. The on-load tap-changer as claimed in claim 1, wherein the auxiliary contact is mechanically coupled to the first selector arm such that the auxiliary contact is configured to move at the same time as the first selector arm, wherein the auxiliary contact is never located on the same fixed contact or on the connection contact at the same time as the first selector arm.

8. The on-load tap changer as claimed in claim 7, wherein the connection contact is adjacent to the first fixed contact and arranged such that when the first selector arm is in contact with the first fixed contact the auxiliary contact is in contact with the connection contact.

9. An on-load tap-changer for switching, without interruption, between winding taps of a tapped transformer, the on-load tap-changer comprising:

fixed contacts comprising:

a first fixed contact, which is configured to connect to a first winding tap of the winding taps of the tapped transformer; and a second fixed contact, which is configured to connect to a second winding tap of the winding taps of the tapped transformer;

a first selector arm, which is configured to controllably and selectively contact each of the fixed contacts;

a second selector arm, which is configured to controllably and selectively contact each of the fixed contacts, the second selector arm being controllable independently of the first selector arm; and a diverter switch configured to controllably perform a switch from the first fixed contact to the second fixed contact of the on-load tap-changer, the diverter switch comprising a semiconductor switch;

a connection contact arranged additionally to the fixed contacts;

an auxiliary contact, which is configured to selectively contact the connection contact or one of the fixed contacts; and a controller, the controller configured to selectively switch the semiconductor switch, wherein the connection contact is bridged with the second fixed contact such that the connection contact and the second fixed contact are fixedly electrically connected, wherein the connection contact is not directly connected to any of the winding taps, and wherein the auxiliary contact is mechanically coupled to the first selector arm such that the auxiliary contact is configured to move at the same time as the first selector arm, wherein the auxiliary contact is never located on the same fixed contact or on the connection contact at the same time as the first selector arm, wherein the controller is configured to be powered by a voltage difference between a voltage of the auxiliary contact and a voltage of the first selector arm.

* * * * *